Nov. 27, 1951        J. B. RATELBAND        2,576,810
CHECK VALVE

Filed July 13, 1950        2 SHEETS—SHEET 1

INVENTOR
JOHANNES BERNADUS RATELAND
BY
Ernest D'Montague
ATTORNEY

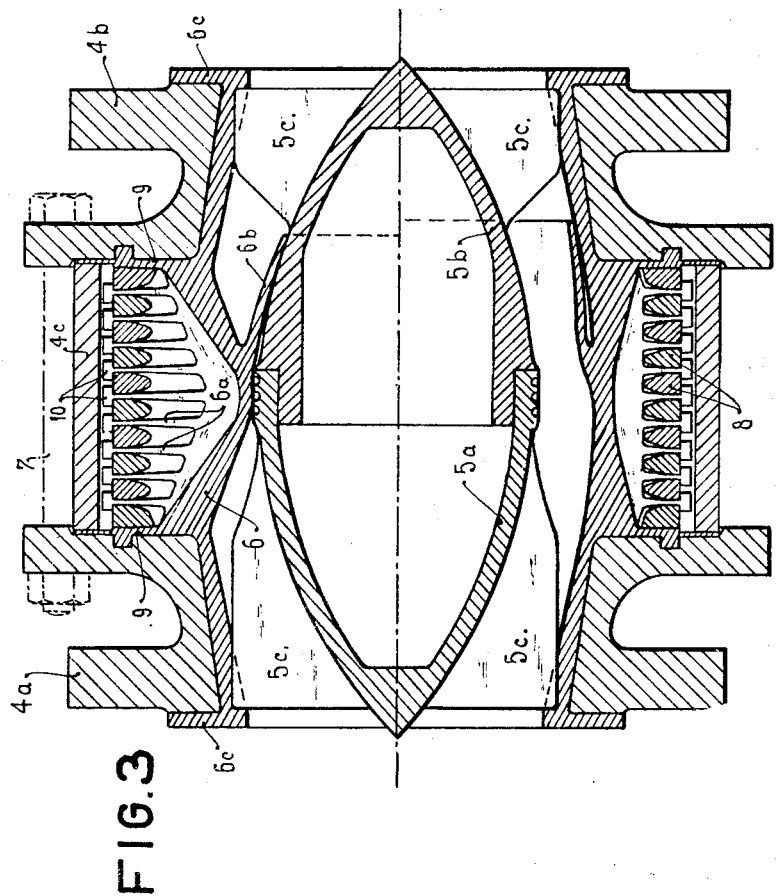

Patented Nov. 27, 1951

2,576,810

UNITED STATES PATENT OFFICE 2,576,810

CHECK VALVE

Johannes B. Ratelband, Barendrecht, Netherlands

Application July 13, 1950, Serial No. 173,579
In the Netherlands March 28, 1949

5 Claims. (Cl. 251—122)

This invention relates to a check-valve or non-return valve consisting of a casing, in which a preferably streamlined body is located leaving at its circumference a passageway with respect to the inside of the housing and being surrounded by a flexible sleeve or diaphragm which at least at one of its ends is anchored to the housing.

Non-return valves of this kind are known in which the flexible sleeve at both ends is anchored to the housing and with its central portion is in sealing contact with the streamlined core body. With said known valves the flexible sleeve due to its attachment meets a considerable resistance when tending to expand for opening the passageway for the flow of fluid.

The invention has for its object to improve a non-return valve of the kind referred to in such a manner that the diaphragm opens the passageway for the flow of fluid therethrough already at a small pressure-head at the inlet side of the housing and yet closes immediately upon a very small back pressure at the discharge side of the valve and thus prevents backward flow of fluid. According to the invention the flexible sleeve at its outer circumference is provided with one or more annular ribs which are secured to the housing so as to partly hold the sleeve pulled away from the core body in the position for allowing the passage of fluid, the sleeve with a free annular tongue being clamped on the core member. Due to the tension of the ribs the flexible sleeve will engage the core body only with a very small pressure so that the sleeve upon a slight pressure head at the inlet side is disengaged from the core body and the fluid on its flow is not subjected to resistance from the flexible sleeve, whereas upon a decrease in pressure at the inlet side of the housing the tongue of the sleeve is immediately forced into engagement with the streamlined body.

The invention will further be described with reference to the accompanying drawing in which two embodiments of a non-return valve according to the invention are illustrated.

Fig. 3 is a longitudinal section of the second embodiment which is particularly adapted to be used for chemically reacting liquids or gases or fluids containing solid particles.

In both embodiments the housing of the valve consists of two end pieces 4a and 4b each provided with a flange for connecting the housing to a pipe line and further of a central part 4c.

Figure 1:
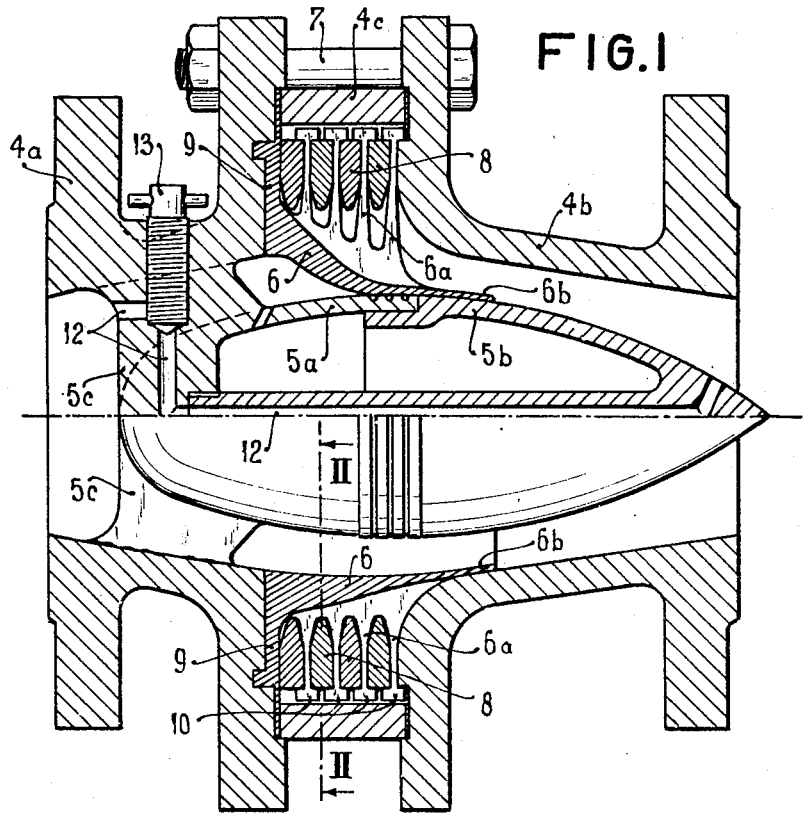
Fig. 1 is a longitudinal section of the first embodiment.
Figure 2:
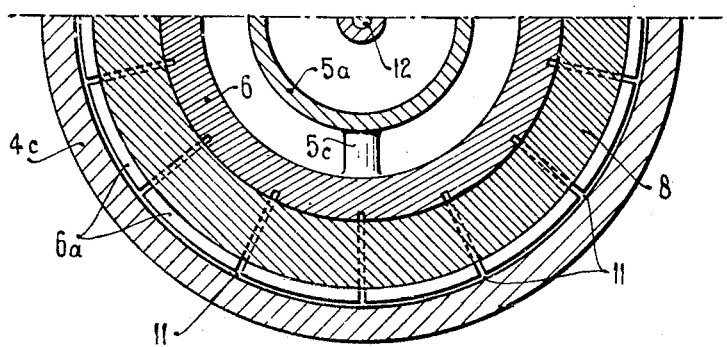
Fig. 2 is part of a cross section taken along the line II—II of Fig. 1.

In the interior of the housing a torpedo-shaped body is located which consists of two parts 5a and 5b of which in the embodiment shown in Figs. 1 and 2 the part 5a is united with the part 4a of the housing by means of two longitudinal and diametrically opposed ridges 5c.

As shown in Fig. 1 a sleeve-like diaphragm 6 made of rubber lies with its flange 9 against the inner flange of the end piece 4a of the housing which is conically widened toward the central part 4c and the flange 9 of the diaphragm is anchored to said flange.

The diaphragm 6 is provided with a number of parallel circular thin ribs 6a which at their circumferential rims 10 are thickened and extend nearly to the inner surface of the central part 4c of the housing and by means of bolts 7 are clamped between distance-rings 8 and the end pieces 4a, 4b. Moreover the ribs 6a with their thickened rims 10 bear on the rings 8.

The ribs 6a each are divided into segments by a number of cuts 11 (Fig. 2) provided along the whole circumference of the ribs and located in planes through the axis of the housing and partly extending into the tube-like part of the diaphragm as appears from Fig. 1 in order to facilitate the diaphragm to be pulled upwards.

With the embodiment according to Figs. 1 and 2 the diaphragm at the downstream side of the housing terminates in a thin tongue 6b which in the position of rest of the diaphragm engages the body 5 on a certain area with a slight tension as shown in the upper half of Fig. 1. The tongue 6b through the pressure of the liquid entering the valve housing from the left in Fig. 1 together with the tension of the stretched ribs 6a is expanded outwards until it rests against the inner surface of the end piece 4b as shown in the lower half of Fig. 1. If, however, a back pressure is formed at the discharge side of the housing the diaphragm immediately closes before the direction of flow of the liquid is reversed so that blows of the diaphragm are prevented.

As shown in Fig. 1 the valve is provided with a by-pass 12 which may be shut off by means of a needle valve 13.

In the alternative embodiment of the invention illustrated in Fig. 3 the sleeve-like diaphragm 6 extends through the whole axial length of the housing and the flanges 6c of the diaphragm are lying against the corresponding flanges of the parts 4a and 4b of the housing. The diaphragm is further provided with two circular collars 9 which are each anchored into the corresponding flange of the parts 4a and 4b.

With this embodiment the annular tongue 6b forms part of the central portion of the diaphragm and in closed position engages the torpedo-shaped body 5a, 5b with a slight tension, as shown in the upper half of Fig. 1. By the pressure of the liquid entering the valve housing the diaphragm is forced into the position shown in the lower half of Fig. 3 in which the liquid may freely pass through the valve.

In the embodiment according to Fig. 3 the liquid does not come in contact with the housing and, therefore, said embodiment is particularly adapted for chemically reacting liquids. The liquid cannot reach the ribs 6a of the diaphragm so that said embodiment may be used for liquids containing solid impurities as the solid particles cannot be accumulated between the ribs.

As shown in Fig. 3 the body 5a, 5b is provided with ribs through the intermediary of which it is supported in the diaphragm.

It is to be noted that the ribs 6a may be formed as shall thin fins and that they may be obliquely directed to the longitudinal axis of the diaphragm.

Although the valve has been described in connection with liquids it may also be used for gases.

What I claim is:

1. A check valve, comprising a housing and a core body located in said housing and leaving at its circumference a passageway with respect to the inside of the housing, a flexible diaphragm, said body being surrounded by said flexible diaphragm, at least one of the ends of the latter being secured to the housing and said diaphragm being provided at its circumference with at least one outwardly directed annular rib secured to the housing in tensioned condition so as to partly expand the diaphragm to its position for allowing the passage of fluid, said diaphragm extending into an annular sleeve-like portion clamping around said core body.

2. A check valve, comprising a housing and a core body located in said housing and leaving at its circumference a passageway with respect to the inside of the housing, a flexible diaphragm having a main portion and an annular sleeve like portion, said body being surrounded by said flexible diaphragm, at least one of the ends of the latter being secured to the housing and said diaphragm being provided at its circumference with at least one outwardly directed annular rib secured to the housing in tensioned condition so as to partly expand the diaphragm to its position for allowing the passage of fluid, said diaphragm extending into said annular sleeve-like portion, the wall of said sleeve-like portion being substantially thinner than that of said main portion of the diaphragm and the free end of said sleeve-like portion clamping around said core body.

3. A check valve, comprising a housing and a core body located in said housing and leaving at its circumference a passageway with respect to the inside of the housing, a flexible diaphragm, said body being surrounded by said flexible diaphragm, at least one of the ends of the latter being secured to the housing and said diaphram being provided at its circumference with outwardly directed annular ribs, clamping rings cooperating with said ribs, and each of the ribs having a thickened rim and bearing with said rim on the cooperating clamping rings, said diaphragm extending into an annular sleeve-like portion clamping around said core body.

4. A check valve, comprising a housing and a core body located in said housing and leaving at its circumference a passageway with respect to the inside of the housing, a flexible diaphragm having a main portion and an annular sleeve-like portion, said body being surrounded by said flexible diaphragm, at least one of the ends of the latter being secured to the housing and said diaphragm being provided at its circumference with outwardly directed annular ribs, clamping rings cooperating with said ribs, and each of the ribs having a thickened rim and bearing with said rim on the cooperating clamping rings, said diaphragm extending into said annular sleeve-like portion, the wall of said sleeve-like portion being substantially thinner than that of said main portion of said diaphragm and the free end of said sleeve-like portion clamping around said core body.

5. A check valve, comprising a housing having two end pieces each provided with a flange for connecting the said housing to a pipeline, and a core body located in said housing and leaving at its circumference a passageway with respect to the inside of the housing, a flexible diaphragm, said body being surrounded by said flexible diaphragm extending through the length of the said housing and having end flanges, each of the said flanges of the diaphragm lying against the corresponding flange of said housing, said diaphragm being provided at its circumference with at least one outwardly directed annular rib secured to the housing in tensioned condition so as to partly expand the diaphragm in its position for allowing the passage of fluid, said diaphragm extending into an annular sleeve-like portion clamping around said core body.

JOHANNES B. RATELBAND.

REFERENCES CITED

The following references are of record in the file of this patent:

UNITED STATES PATENTS

| Number | Name | Date |
|---|---|---|
| 1,800,066 | Glass | Apr. 7, 1931 |
| 2,247,363 | Dunn | July 1, 1941 |
| 2,395,906 | Owens | Mar. 5, 1946 |
| 2,467,150 | Nordell | Apr. 12, 1949 |
| 2,518,625 | Langstaff | Aug. 15, 1950 |

FOREIGN PATENTS

| Number | Country | Date |
|---|---|---|
| 333,276 | Germany | of 1921 |